United States Patent Office 2,773,093

Patented Dec. 4, 1956

2,773,093

PROCESS FOR THE PRODUCTION OF AMINOCARBOXYLIC ACIDS AND THEIR N-SUBSTITUTED DERIVATIVES

Adolf Christian Josef Opfermann, Bergisch-Gladbach, Germany

No Drawing. Application September 16, 1952, Serial No. 309,938

Claims priority, application Germany September 17, 1951

4 Claims. (Cl. 260—534)

The present invention relates to the preparation of ω-aminocarboxylic acids.

Whereas α-aminocarboxylic acids occur in nature and can also be easily prepared, aminocarboxylic acids which contain the amino group in a position other than the α-position, e. g. in the ω-position, are comparatively difficult to prepare.

One method of producing such aminocarboxylic acids involves, for example, the preparation of ketocarboxylic acids, the hydrazone compounds of which are converted into aminocarboxylic acids.

Another method starts from cyclic bases, for example from N-benzoyl piperidine, which, by being reacted with phosphorus pentachloride and potassium cyanide and saponification of the cyano compounds obtained, lead to the desired ε-aminocaproic acid.

For the preparation of the N-substituted aminocarboxylic acids, the aminocarboxylic acids prepared in this way must be correspondingly substituted.

It is known to produce N-substituted aminocarboxylic acids by reacting nitrogen-containing organic compounds, which contain hydrogen, replaceable by metal, attached to the nitrogen, in the form of their alkali metal or earth alkali metal compounds with γ-lactones.

However, the present invention is not concerned with such a process.

In the case of the reaction, in the process according to the invention, the production of the expensive alkali metal or earth-alkali compound from the organic nitrogen-containing compound concerned and, for example, sodium ethylate is unnecessary.

It has now been found that aminocarboxylic acids and their N-substituted derivatives, which contain an amino group or an N-substituent in the ω-position, are obtained simply and in good yield, by starting from lactones or substituted lactones, reacting them with amides of carboxylic acids and saponifying the N-substituted aminocarboxylic acids obtained. The reaction can, in the case of substituted lactone, with the employment of hydrochloric acid as saponifying agent, be represented by the following equation:

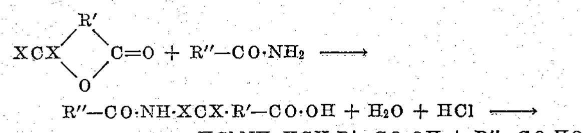

$$R''-CO\cdot NH\cdot XCX\cdot R'-CO\cdot OH + H_2O + HCl \longrightarrow HCl\cdot NH_2\cdot XCX\cdot R'-CO\cdot OH + R''-CO\cdot HO$$

In this equation, R′ denotes a substituted or an unsubstituted carbon chain, containing one or more carbon atoms and R″ denotes hydrogen or an aliphatic, aromatic, alicyclic or heterocyclic radical. By X is to be understood hydrogen or a hydrocarbon radical, but not sulphur, oxygen or nitrogen.

According to the invention, for the purpose of producing aminocarboxylic acids and their N-substituted derivatives, lactones or substituted lactones are reacted with acid amides with the application of heat, advantageously with the exclusion of moisture, and the N-substituted amino acids obtained are saponified to give amino acids.

The initial substances employed may be the known lactones, such as propiolactone, butyrolactone, valerolactone, and caprolactone and their homologues.

In the production of N-substituted aminocarboxylic acids, lactones substituted with acylated groups may be employed with great advanage if it is required to obtain an acylamino group in a particular position without the other acylatable groups being acylated.

If, however, it is desired to obtain aminocarboxylic acids as end products, there may be employed lactones that are substituted with groups that can react with ammonia. Examples of such groups are, principally, halogens. In this case, there are obtained aminocarboxylic acids which still contain halogen for example.

Such lactones may be reacted with aliphatic, aromatic, alicyclic or heterocyclic acid amides. Examples of such acid amides are formamide, acetamide, propionamide, benzoylamide, and the amides of palmitic, stearic and salicyclic acids.

The saponification of the N-substituted amino-carboxylic acids is carried out with acids or alkalis, for example hydrochloric acid or a solution of caustic soda, with the application of heat. The amino-carboxylic acids obtained are concentrated in vacuo till crystallization takes place and are dried by means of drying agents, such as calcium chloride.

The aminocarboxylic acids and their N-substituted derivatives are valuable medicinal substances.

EXAMPLES

*Example 1*

18 parts by weight of α-amino-γ butyrolactone were heated with 8.2 parts by weight of formamide in a round-bottomed flask with a silica-gel stopper for from half-an-hour to an hour at 180° C. After cooling, the product of the reaction was recrystallised in acetone and dried in the dessicator over calcium chloride.

The compound obtained has the following formula $$H.OC.NH.CH_2.CH_2.CHNH_2.COOH$$

Analysis showed the following contents of carbon and hydrogen:

| | |
|---|---|
| Calculated | 41.1% C. and 6.85% H. |
| Found | 41.5% C. and 7.0% H. |

Of this γ-N-substituted aminocarboxylic acid, 6.5 gms. were treated with 50 ccs. of a 5% solution of hydrochloric acid and the whole was heated for two hours at 60 to 80° C. with constant stirring. The hydrochloride obtained of α,γ-diaminobutyric acid was then concentrated in vacuo until crystallisation took place and the crystals obtained were dried in a dessicator over calcium chloride.

Analysis showed the following content of carbon and hydrogen:

| | |
|---|---|
| Calculated | 25.12% C. and 6.29% H. |
| Found | 25.5% C. and 6.30% H. |

*Example 2*

165 gms. (1 mole) of α-bromo-γ-butyrolactone were heated with 67.5 gms. of formamide in a round-bottomed flask with a silica-gel stopper and constant stirring for 6 hours at 105 to 120° C. After cooling, the reaction product was subjected to distillation. The compound obtained, which boils at 123° C. under pressure of 5 mms. of mercury, has the following formula:

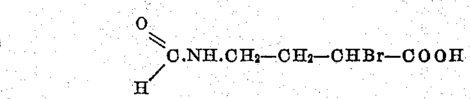

Analysis showed the following content of carbon and hydrogen:

Calculated ---------- 28.55% C. and 3.81% H.
Found ---------- 29.99% C. and 3.50% H.

The yield amounts to 45% of the theoretical. Saponification of the compounds obtained was carried out as stated in Example 1.

What I claim is:

1. A process for the preparation of an ω-aminocarboxylic acid, which comprises the steps of heating a lactone of the formula $$\underbrace{(CH_2)_n-\overset{X}{\overset{|}{C}}H-CO}_{O}$$

wherein $n$ is a whole number from 2 to 5 inclusive, and X is selected from the group consisting of H, Br and $NH_2$, with a carboxylic acid amide, selected from the group consisting of formamide, acetamide, propionamide, palmitamide, stearamide, salicylamide and benzoylamide, whereby splitting of the lactone ring takes place with formation of the corresponding N-substituted aminocarboxylic acid of the formula $$R.CO.NH.(CH_2)_n\overset{X}{\overset{|}{C}}H.COOH$$

wherein $n$ and X have the aforesaid significances and R.CO.NH is the radical of the aforesaid carboxylic acid amide, and then converting the said N-substituted aminocarboxylic acid into the corresponding ω-aminocarboxylic acid of the formula $$NH_2.(CH_2)_n\overset{X}{\overset{|}{C}}H.COOH$$

wherein $n$ and X again have the aforesaid significances, by means of a saponifying agent.

2. A process according to claim 1, wherein the heating step is carried out with the exclusion of moisture.

3. A process according to claim 1, wherein the said lactone contains an α-bromo substituent.

4. A process according to claim 1, wherein the said lactone contains an α-amino substituent.

References Cited in the file of this patent

UNITED STATES PATENTS 2,271,872 Mitchell ---------- Feb. 3, 1942
2,461,842 Olin ---------- Feb. 15, 1949
2,525,794 Gresham et al. ---------- Oct. 17, 1950
2,526,556 Gresham et al. ---------- Oct. 17, 1950
2,563,035 Gresham et al. ---------- Aug. 7, 1951

FOREIGN PATENTS 62,989 Denmark ---------- Dec. 11, 1944